United States Patent
Sutskover et al.

(10) Patent No.: US 7,907,910 B2
(45) Date of Patent: Mar. 15, 2011

(54) METHOD AND APPARATUS TO VARY POWER LEVEL OF TRAINING SIGNAL

(75) Inventors: Ilan Sutskover, Hadera (IL); David Ben-Eli, Modiin (IL)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 10/902,945

(22) Filed: Aug. 2, 2004

(65) Prior Publication Data

US 2006/0025080 A1     Feb. 2, 2006

(51) Int. Cl.
*H04B 1/00* (2006.01)

(52) U.S. Cl. ...... 455/69; 455/522; 455/127.1; 455/127.2; 455/73; 455/68; 455/67.11; 455/115.1; 455/115.2; 455/115.3; 455/420; 455/517

(58) Field of Classification Search ............ 455/69, 455/522, 127.1, 127.2, 68, 67.11, 73, 115.2, 455/115.3, 420, 13.4, 517, 115.1
See application file for complete search history.

(56) References Cited

U.S. PATENT DOCUMENTS

| | | | |
|---|---|---|---|
| 5,450,616 A * | 9/1995 | Rom | 455/69 |
| 5,551,057 A * | 8/1996 | Mitra | 455/522 |
| 5,574,983 A * | 11/1996 | Douzono et al. | 455/69 |
| 5,701,294 A * | 12/1997 | Ward et al. | 370/252 |
| 5,838,673 A * | 11/1998 | Ritz et al. | 370/336 |
| 5,852,782 A * | 12/1998 | Komatsu | 455/522 |
| 5,893,035 A * | 4/1999 | Chen | 455/522 |
| 5,898,927 A * | 4/1999 | Ishii et al. | 455/450 |
| 6,067,446 A * | 5/2000 | Persson et al. | 455/69 |
| 6,131,015 A * | 10/2000 | Hill et al. | 455/69 |
| 6,449,462 B1 * | 9/2002 | Gunnarsson et al. | 455/67.13 |
| 6,522,642 B1 * | 2/2003 | Scott | 370/342 |
| 6,671,499 B1 * | 12/2003 | Ylitalo et al. | 455/101 |
| 6,693,536 B2 * | 2/2004 | Bauer, Jr. et al. | 340/561 |
| 6,728,292 B2 * | 4/2004 | Zeira et al. | 375/130 |
| 6,751,448 B1 * | 6/2004 | Frydman et al. | 455/126 |
| 6,771,628 B1 * | 8/2004 | Soderkvist et al. | 370/337 |
| 6,839,545 B2 * | 1/2005 | Riikonen | 455/67.11 |
| 6,845,122 B2 * | 1/2005 | Zeira et al. | 375/130 |
| 6,917,811 B2 * | 7/2005 | Kim et al. | 455/452.1 |
| 6,928,102 B2 * | 8/2005 | Zeira et al. | 375/130 |
| 6,958,986 B2 * | 10/2005 | Cain | 370/337 |
| 6,987,750 B2 * | 1/2006 | Soderkvist et al. | 370/337 |

(Continued)

FOREIGN PATENT DOCUMENTS

CN     1344445     4/2002

(Continued)

OTHER PUBLICATIONS

Search Report for PCT/US2005/023953, mailed on Nov. 11, 2005.

(Continued)

*Primary Examiner* — Duc Nguyen
*Assistant Examiner* — Ankur Jain
(74) *Attorney, Agent, or Firm* — Pearl Cohen Zedek Latzer, LLP

(57) ABSTRACT

Briefly, a method to transmit over an uplink channel a training signal having a power level which varies according to a parameter related to downlink channel characteristics is provided. Communication system that includes communication devices to transmit and receive the training signal is further provided.

12 Claims, 1 Drawing Sheet

U.S. PATENT DOCUMENTS

| | | | |
|---|---|---|---|
| 6,996,375 B2 * | 2/2006 | Dent et al. | 455/67.16 |
| 7,003,310 B1 * | 2/2006 | Youssefmir et al. | 455/522 |
| 7,042,856 B2 * | 5/2006 | Walton et al. | 370/329 |
| 7,050,824 B2 * | 5/2006 | Masseroni et al. | 455/522 |
| 7,061,891 B1 * | 6/2006 | Kilfoyle et al. | 370/335 |
| 7,069,035 B2 * | 6/2006 | Chen et al. | 455/522 |
| 7,072,680 B2 * | 7/2006 | Lee et al. | 455/522 |
| 7,075,969 B2 * | 7/2006 | Zeira et al. | 375/130 |
| 7,082,107 B1 * | 7/2006 | Arvelo | 370/311 |
| 7,085,579 B2 * | 8/2006 | Mizutani et al. | 455/512 |
| 7,116,983 B2 * | 10/2006 | Lan et al. | 455/452.2 |
| 7,120,188 B2 * | 10/2006 | Zeira et al. | 375/130 |
| 7,120,400 B2 * | 10/2006 | Korol | 455/126 |
| 7,174,178 B2 * | 2/2007 | Bergel | 455/502 |
| 7,200,374 B1 * | 4/2007 | Stephens | 455/254 |
| 7,245,880 B1 * | 7/2007 | Jacobsen | 455/69 |
| 7,280,804 B2 * | 10/2007 | Jacobsen et al. | 455/67.11 |
| 7,286,855 B2 * | 10/2007 | Raleigh et al. | 455/562.1 |
| 2002/0016179 A1 * | 2/2002 | Baker et al. | 455/522 |
| 2002/0031105 A1 * | 3/2002 | Zeira et al. | 370/337 |
| 2002/0090966 A1 * | 7/2002 | Hansen et al. | 455/522 |
| 2002/0159422 A1 * | 10/2002 | Li et al. | 370/342 |
| 2003/0054849 A1 * | 3/2003 | Koo et al. | 455/522 |
| 2003/0054850 A1 * | 3/2003 | Masseroni et al. | 455/522 |
| 2003/0207696 A1 * | 11/2003 | Willenegger et al. | 455/522 |
| 2004/0022207 A1 * | 2/2004 | Leung et al. | 370/321 |
| 2004/0109419 A1 * | 6/2004 | Sano et al. | 370/320 |
| 2004/0141467 A1 * | 7/2004 | Zeira et al. | 370/252 |
| 2004/0208138 A1 * | 10/2004 | Hayashi et al. | 370/286 |
| 2004/0209585 A1 * | 10/2004 | Wang et al. | 455/226.1 |
| 2004/0252666 A1 * | 12/2004 | Johnson | 370/335 |
| 2005/0032540 A1 * | 2/2005 | Lee et al. | 455/522 |
| 2005/0141459 A1 * | 6/2005 | Li et al. | 370/334 |
| 2005/0264395 A1 * | 12/2005 | Bassi | 340/3.1 |
| 2006/0003789 A1 * | 1/2006 | Murata et al. | 455/522 |
| 2006/0121946 A1 * | 6/2006 | Walton et al. | 455/561 |

FOREIGN PATENT DOCUMENTS

| | | | |
|---|---|---|---|
| EP | 579372 A2 * | 1/1994 | |
| EP | 0 921 644 | 6/1999 | |
| EP | 921644 A1 * | 6/1999 | |
| EP | 1 035 658 | 9/2000 | |
| EP | 1035658 A1 * | 9/2000 | |
| EP | 1 122 965 | 8/2001 | |
| TW | 329579 | 4/1998 | |
| TW | 396683 | 7/2000 | |
| TW | 0546957 | 8/2003 | |
| TW | 0233274 | 5/2005 | |
| WO | WO 9115071 A1 * | 10/1991 | |
| WO | WO 9406217 A1 * | 3/1994 | |
| WO | WO 9604718 A1 * | 2/1996 | |
| WO | WO2004/038986 | 5/2004 | |

OTHER PUBLICATIONS

Frederick W. Vook, "Signaling Methodologies to Support Closed-Loop Transmit Processing in TDD-OFDMA", IEEE 802.16 Broadband Wireless Access Working Group, http://ieee802.org/16.

Office Action of German Application No. 11 2005 001 877.6, mailed on Oct. 11, 2010.

* cited by examiner

METHOD AND APPARATUS TO VARY POWER LEVEL OF TRAINING SIGNAL

BACKGROUND OF THE INVENTION

In modern communication systems such as wireless local area network (WLAN), wireless metropolitan area network (WMAN) or cellular systems, advanced communication technologies may utilize downlink channel knowledge at the transmitter to increase total throughput of data transportation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
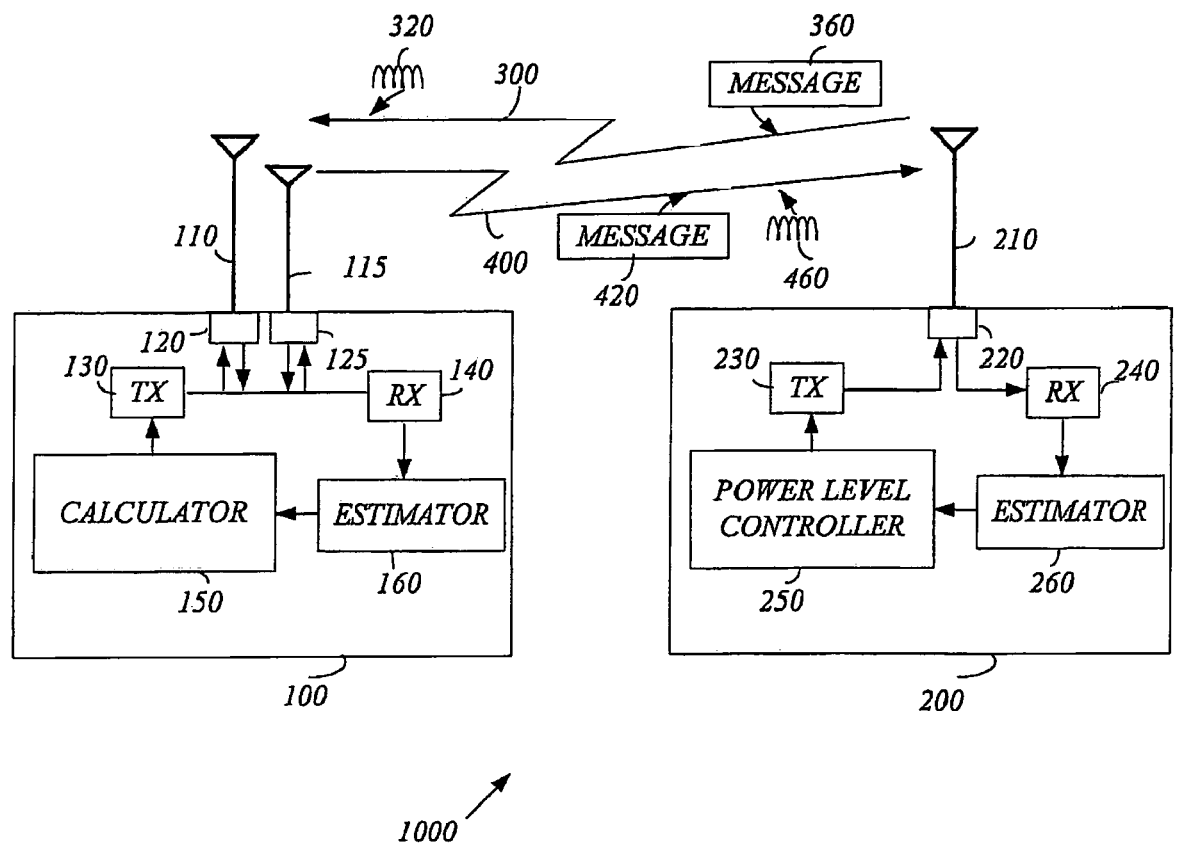
FIG. 1 is an illustration of a portion of communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals. These algorithmic descriptions and representations may be the techniques used by those skilled in the signal processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as communication devices of a radio system. The communication devices intended to be included within the scope of the present invention include, by way of example only, mobile stations, base stations and access points of radio systems such as, for example wireless local area network (WLAN), wireless metropolitan area network (WMAN) two-way radio transmitters, digital system transmitters, analog system transmitters, cellular radiotelephone transmitters, digital subscriber lines, and the like.

WMAN and/or WLAN mobile stations and/or base stations intended to be within the scope of the present invention include, although are not limited to, transmitters and receivers for transmitting and receiving spread spectrum signals such as, for example, Frequency Hopping Spread Spectrum (FHSS), Direct Sequence Spread Spectrum (DSSS), and the like. The spread spectrum signals may be either in Frequency Division Multiplexing (FDM) (such as Orthogonal Frequency Division Multiplexing/Orthogonal Frequency-Division Multiple Access (OFDM/OFDMA) or in time division multiplexing (TDM) or in Code Division Multiple Access (CDMA), if desired.

Some embodiments of the invention may be implemented, for example, using a machine-readable medium or article which may store an instruction or a set of instructions that, if executed by a machine (for example, by mobile station 200 of FIG. 1, and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

In accordance with embodiments of the invention, a channel may be a physical transfer medium. The physical transfer medium may be used to transfer signals such as, for example, informative data signals, training signals, pilot signals, subcarriers signals, preamble signals and the like, that may be modulated by one or more modulation scheme. Furthermore, the channel may be a combination of the physical transfer medium, components of the transmitter and/or the receiver, for example path loss, noise, interference or the like. It should be understood to the skilled artisan that embodiments of the invention may operate with many types of signals, which partially mention above, and the invention is in no way limited to the above mentioned signals. For the clearness of the description, embodiments of the invention will be described with training signals, although the scope of the present invention is in no way limited in this respect.

Turning to FIG. 1, a communication system such as, for example, a wireless metropolitan area network (WMAN) 1000, in accordance with exemplary embodiment of the invention is shown. Although the scope of the present invention is not limited in this respect, IEEE standard 802.16 family may describe an air interface for broadband wireless access that may be used with WMAN 1000. WMAN 1000 may include a base station 100, a mobile station 200, an uplink channel 300 and a downlink channel 400. Uplink channel 300 and downlink channel 400 may include one or more channels.

Although the scope of the present invention is not limited in this respect, mobile station 200 may include one or more antennas, for example an antenna 210. In addition, mobile station 200 may includes an antenna port 220, a transmitter (TX) 230, a receiver (RX) 240, a power level controller 250 and an estimator 260.

Although the scope of the present invention is not limited in this respect, base station 100 may include one or more antennas, for example antennas 110 and 115. In addition base station 100 may include one or more antenna ports 120 and 125, a transmitter (TX) 130, a receiver (RX) 140, a calculator 150 and an estimator 160. The antennas of mobile station 200 and or base station 100 may include a dipole antenna, an omni-directional antenna, an internal antenna, a Yagi antenna, or the like.

Although the scope of the present invention is not limited in this respect, obtaining characteristics of downlink channel 400 at base station 100 may be done via Time Division Duplex (TDD) reciprocity, if desired. The qualities of TDD reciprocity may be obtained when using similar frequency band for the uplink and downlink channels. According to some embodiments of the present invention, downlink channel characteristic may be deduced from knowledge of the characteristics of the uplink channel 300. For example, mobile station 200 and base station 100 may transmit in a TDD system. Mobile station 200 may transmit training signals over uplink channel 300 at a power level that may be varied according to a function known to base station 100, thus allowing base station 100 to measure and/or to estimate uplink channel characteristics. This may be done by using training signals either in Frequency FDM such as, for example OFDM/OFDMA or in TDM or in CDMA, or the like. In some embodiments of the invention the training signals may include a vector of training symbols. Mobile station 200 may vary a power level of the training symbols according to a parameter related to characteristics of downlink channel 400. In some embodiments different training symbols may have different power level which may vary according to the parameter of downlink channel characteristics.

Although the scope of the present invention is not limited in this respect, mobile station 200 may receive signals over downlink channel 400 and may measure and/or estimate one or more parameters of downlink channel 400 characteristic from the received signal, if desired. In some embodiments of the present invention, mobile station 200 may transmit one or more training signals over uplink channel 300. For example, mobile station 200 may transmit a training signal 320 having a power level which varies according to a parameter related to the downlink channel characteristics.

Although the scope of the present invention is not limited in this respect, downlink channel 400 as presented in the frequency domain, may be defined as Y(f)=H(f)x(f)+N(f), where:

Y may be a vector of measurements of characteristic of downlink channel 400.

x may be a vector of transmitted information;

N may be a vector of noise components whose components may include interference from sources like adjacent base stations; and H is a diagonal matrix of channel coefficients. It should be understood that the some interference components may arise from an internal structure of receiver 240, These may include thermal noise, phase noise, non linearity interference terms or any other internal noise source such as, for example, a path loss or the like.

In some embodiments of the invention, two or more antennas may be used at the transmitter 130. In those embodiments, Y may be $$Y(f) = \sum_{m=1}^{M} H_m(f) x_m(f) + N(f)$$

where $x_m$ may be the signal transmitted from antenna m (e.g. antenna 115 and/or antenna 110) and $H_m$ may be the channel response from the antenna m, (e.g. antenna 115) to the receiving antenna (e.g. antenna 210).

Although the scope of the present invention is not limited to this embodiment, receiver 240 may receive from base station 100 a message 400 that may include a transmit method value. According to some embodiment of the invention, the transmit method value may be a fixed power scheme and/or an interference dependent power scheme. For example, message 420 may include an instruction to transmit the training signals via antenna port 220 according to the interference dependent power scheme, if desired. The interference dependent power scheme may include, transmitting one or more training signals in a power level which may be related to the interference level. According to some embodiment of the invention the power of the interference level of downlink channel 400 may be depicted as $\sigma_d^2(f)$.

According to embodiments of the present invention, receiver 240 may receive a signal 460 that may include the downlink characteristics. Estimator 260 may estimate and/or measured at least one parameter that may be related to the downlink characteristics. For example, estimator 260 may estimate the value of the interference level of the downlink channel 400, for example $\sigma_d^2$. Power level controller 250 may vary the power level of training signal 320 according to the estimated value of the parameter. For example, the power level of j-th uplink training signal P(j) may be calculated according to $$P(j) = TxPower + 10 \log_{10}\left(\frac{1}{T_n} \frac{\min_i \sigma_d^2(i)}{\sigma_d^2(j)}\right)$$

where, in some exemplary embodiment of the invention, TxPower may be the sum of transmit power per OFDMA symbol as set by previously by power level controller 250, and $T_n$ may be the number of training signals.

Although the scope of the present invention is not limited in this respect, transmitter 230 having antenna port 220 may transmit over uplink channel 300 training signal 320 having power level P(j) which is adapted according to a parameter of downlink channel characteristics. For example, the parameter may be the power of interference level $\sigma_d^2$ of downlink channel 400, and/or downlink path loss to interference level ration $$\left[\frac{h_m}{\sigma_d}\right]^2$$

and/or signal to noise ratio (SNR) of downlink channel 400.

Furthermore, in some embodiments of the invention, mobile station 200 may transmit two or more training signals (where n may be the number of training signals) in an average power level T. Thus, the sum of the power levels of training signals may not exceed the desired average power T. For example, assume that the normal average transmit power may set to T then setting $$p = \frac{T}{\sum_{i=1}^{n} \frac{1}{\sigma_M^2(i)}}$$

and transmitting the k-th training signal using the power of $$\frac{p}{\sigma_M^2(k)}$$

may yield a transmission of average power T. In some embodiments of the invention, base station 100 may recover the SINR at mobile station 200 by transmitting the average transmit power T to base station 100 by using for example, a low-rate transmission, if desired.

Although, the scope of the present invention is not limited in this respect, base station 100 may receive by antennas 110 and 115 via antenna ports 120 and 125, respectively, the one or more training signals transmitted by mobile station 200 over uplink channel 400 (e.g. training signal 320). Receiver 140 may receive over uplink channel 400 training signal 320 which is transmitted in a power level inversely proportional to downlink channel chacteristics. Estimator 160 may estimate the characteristics of downlink channel 400 based on the received training signal. Calculator 150 may calculate a transmitting power value $P_{base}$ of a signal 420 to be transmitted over downlink channel 400 based on for example, estimated characteristics of downlink channel 400, for example SINR, as estimated by estimator 160 from training signal 320. Furthermore, calculator 150 may calculate a transmitting power value of signal 420 based on an additional value provided by a message 360 received over uplink channel 300, if desired.

According to some embodiments of the invention, base station 100 may transmit a signal to a user via a selected antenna, if desired. In one embodiment of the invention, in order to reduce the effect of negligible interference levels, terms such as, for example $$\frac{1}{\sigma_M^2(k)}$$

may be replaced with $$\frac{1}{\hat{\sigma}_M^2} Q\left(\frac{\hat{\sigma}_M^2}{\sigma_M^2(k)}\right)$$

where Q(•)Q(.) is a soft clipping function. For example, $$Q(x) = \begin{cases} c & x > c \\ x & |x| \le c \\ -c & x < -c \end{cases}.$$

In addition, the value $\hat{\sigma}_M^2$ may represent the average interference level, if desired.

According to embodiments of the invention, following algorithm may be used at mobile station 200:
1. calculate the interference power level at the receiver side;
2. calculate a constant to reduce near-far effect;
3. calculate the soft power clipping function; and
4. transmitting training signal 320 using a power level which may dependent on the average power level T, the near-far effect and the interference level.

Although the scope of the present invention is not limited in this respect, base station 100 and mobile station 200 may use a protocol which includes messages to perform the algorithms describe above. For example, base station 100 may send a request message, for example message 460, over downlink channel 400. Base station 100 may instructs mobile station 200 to start transmitting training signals by an information element embedded in the request message.

Although the scope of the present invention is not limited in this respect, mobile station may transmit training signals over uplink channel 400 in a power level which is inversely proportional to the interference level. In some embodiments of the invention, mobile station 200 may vary the power level of the training signals according to the interference level. Furthermore, mobile station 200 may transmit training signals with different power levels, if desired. In some embodiments of the invention, mobile station 200 may vary the power level of the training signal whose frequency is in a near vicinity of a frequency of an interferer signal received over downlink channel 400. For example, mobile station 200 may decrease the power level of the training signal whose frequency is in a near vicinity of a frequency of an interferer signal according to the interference level of the interferer signal.

According to some embodiments of the invention mobile station 200 may send a message 360 that may include a value that may be used by base station 100 to calculate characteristics of downlink channels. For example, such a value may be SINR at one or more frequency bins. Base station 100 may measure characteristics of downlink channel 400 by uplink training signal 320 and may transmit signals over downlink channel 400 in a power level which may be related to the interference level and the value received in message 360, if desired.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:
1. A method of assigning power levels to Orthogonal Frequency-Division Multiple Access (OFDMA) training signals comprising:
   receiving, over a downlink, a message including a transmit method value, wherein the transmit method value indicates an interference dependent power scheme;
   determining a transmission power level P(j) of each uplink OFDM training signal (j) according to

$$P(j) = TxPower + 10\log_{10}\left(\frac{1}{T_n} \frac{\min_i \sigma_d^2(i)}{\sigma_d^2(j)}\right),$$

wherein TxPower is a sum of transmit power per OFDMA symbol, $T_n$ is a number of training signals and $\sigma_d^2(j)$ is the interference level measured at the vicinity of the j-th training signal;

decreasing the transmission power level of each uplink OFDMA training signal whose frequency is in a near vicinity of a frequency of an interferer signal according to the interference level of the interferer signal; and transmitting the OFDM training signals over the uplink according to the interference dependent power scheme.

2. The method of claim 1, wherein transmitting comprises:

transmitting at least one OFDMA training signal of the OFDMA training signals to provide a function of an interference level of a downlink channel.

3. The method of claim 1, comprising:

transmitting a message over an uplink, wherein the message includes a value for calculating a characteristic of first and second downlink channels.

4. The method of claim 3, wherein transmitting the message comprises transmitting the message including a signal to interference and noise ratio.

5. The method of claim 2, comprising:

transmitting each OFDMA training signal at a power level inversely proportional to an interference level of a frequency in the vicinity of a downlink OFDMA training signal frequency, wherein a sum of power levels of all OFDMA training signals is not exceeding a desired average power level.

6. A wireless communication device comprising:

a receiver to receive, over a downlink, a message including a transmit method value, wherein the transmit method value indicates an interference dependent power scheme;

an estimator to estimate an interference power level of each Orthogonal Frequency-Division Multiple Access (OFDMA) training signal received over the downlink;

a power level controller to determine a transmission power p(j) of each uplink OFDM training signal (j) according to $$P(j) = TxPower + 10\log_{10}\left(\frac{1}{T_n} \frac{\min_i \sigma_d^2(i)}{\sigma_d^2(j)}\right),$$

wherein TxPower is a sum of transmit power per OFDMA symbol, $T_n$ is a number of training signals and $\sigma_d^2(j)$ is the interference level measured at the vicinity of the j-th training signal and said power level controller is able to decrease the transmission power level of each uplink OFDMA training signal whose frequency is in a near vicinity of a frequency of an interferer signal according to the interference level of the interferer signal; and a transmitter to transmit the uplink OFDMA training signals according to the interference dependent power scheme.

7. The wireless communication device of claim 6, wherein the transmitter is able to transmit each uplink OFDMA training signal at a power level inversely proportional to an interference level of a frequency in a vicinity in frequency of a downlink OFDMA training signal frequency and wherein a sum of power levels of the all uplink OFDMA training signals is not exceeding a desired average power level.

8. The wireless communication device of claim 6, wherein the transmitter is able to transmit a message including a value of a characteristic of the downlink channel over an uplink.

9. The wireless communication device of claim 8, wherein said characteristic is a signal to interference and noise ratio.

10. The wireless communication device of claim 6, wherein the transmitter is able to transmit the uplink OFDMA training signal in a time division duplex system.

11. The wireless communication device of claim 6, wherein the message includes an instruction to transmit uplink OFDMA training signals according to a fixed power scheme.

12. The method of claim 1, comprising:

transmitting said message over an uplink, wherein the message includes an instruction to transmit uplink OFDMA training signals according to a fixed power scheme.

* * * * *